US011966779B2

(12) United States Patent
Castinado et al.

(10) Patent No.: US 11,966,779 B2
(45) Date of Patent: Apr. 23, 2024

(54) SYSTEM AND METHOD FOR TRANSFER OF DIGITAL RESOURCES USING AN INTEGRATED RESOURCE PLATFORM

(71) Applicant: BANK OF AMERICA CORPORATION, Charlotte, NC (US)

(72) Inventors: Joseph Benjamin Castinado, North Glenn, CO (US); Kevin Graham Robberts, Charlotte, NC (US); Naoll Addisu Merdassa, Chakopee, MN (US); Brandon Ingram, Charlotte, NC (US); Ann Ta, Scottsdale, AR (US); Hosam Sonny ElHamahmy, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 423 days.

(21) Appl. No.: 17/372,721

(22) Filed: Jul. 12, 2021

(65) Prior Publication Data
US 2023/0009622 A1   Jan. 12, 2023

(51) Int. Cl.
  G06F 21/60    (2013.01)
  G06F 9/451    (2018.01)
  G06F 9/50     (2006.01)
  G06F 21/64    (2013.01)

(52) U.S. Cl.
  CPC .......... G06F 9/5005 (2013.01); G06F 9/451 (2018.02); G06F 21/602 (2013.01)

(58) Field of Classification Search
  CPC ....... G06F 9/5005; G06F 9/451; G06F 21/602
  USPC ...................................................... 713/189
  See application file for complete search history.

(56) References Cited

U.S. PATENT DOCUMENTS

| | | | |
|---|---|---|---|
| 7,065,579 B2 | 6/2006 | Traversat et al. | |
| 7,181,017 B1 | 2/2007 | Nagel et al. | |
| 7,805,377 B2 | 9/2010 | Felsher | |
| 8,069,204 B2 | 11/2011 | Reisman | |
| 8,468,244 B2 | 6/2013 | Redlich et al. | |
| 8,583,683 B2 | 11/2013 | Rathod | |
| 8,650,226 B2 | 2/2014 | Bobick et al. | |
| 8,855,469 B2 | 10/2014 | Maharajh et al. | |
| 8,875,215 B2 | 10/2014 | Reisman | |
| 9,111,211 B2* | 8/2015 | Mason | G06F 16/951 |

(Continued)

OTHER PUBLICATIONS

A.A. Zatsarinnyy; Model of a Prospective Digital Platform to Consolidate the Resources of Economic Activity in the Digital Economy; Science Direct: 2019; pp. 552-556.*

*Primary Examiner* — Monjur Rahim
(74) *Attorney, Agent, or Firm* — Moore & Van Allen PLLC; Seongun M. Hong (57) ABSTRACT

A system is provided for transfer of digital resources using an integrated resource platform. In particular, the system may comprise a networked platform that may be accessible by one or more users to access digital resources (e.g., non-fungible tokens stored on a distributed register). The platform may further display a graphical user interface through which the user may take various actions with respect to such digital resources, including the ability to view metadata associated with the resources or to transfer the resources. In this regard, the platform may integrate multiple different types of distributed registers and/or legacy computing systems such that the user may access the digital resources along with the functions associated therewith.

20 Claims, 3 Drawing Sheets

(56) References Cited

U.S. PATENT DOCUMENTS

| | | | |
|---|---|---|---|
| 9,135,344 B2 | 9/2015 | Mason et al. | |
| 9,501,666 B2 | 11/2016 | Lockett et al. | |
| 9,961,155 B1* | 5/2018 | Chan | H04L 61/50 |
| 10,104,053 B2 | 10/2018 | Wipfel et al. | |
| 10,250,757 B2 | 4/2019 | Russell | |
| 10,310,760 B1* | 6/2019 | Dreier | G06F 13/42 |
| 10,373,129 B1* | 8/2019 | James | H04L 9/06 |
| 10,521,778 B2 | 12/2019 | Bull et al. | |
| 10,929,842 B1* | 2/2021 | Arvanaghi | H04L 9/3239 |
| 11,200,569 B1* | 12/2021 | James | G06Q 20/381 |
| 11,308,487 B1* | 4/2022 | Foster | G06Q 20/3829 |
| 11,334,883 B1* | 5/2022 | Auerbach | G06Q 20/223 |
| 11,522,700 B1* | 12/2022 | Auerbach | H04L 9/3213 |
| 11,526,875 B1* | 12/2022 | Shetti | G06Q 20/3678 |
| 11,599,858 B2* | 3/2023 | Gaur | G06Q 20/3827 |
| 2012/0246201 A1* | 9/2012 | Starr | G06F 16/119 |
| | | | 707/E17.005 |
| 2015/0135214 A1* | 5/2015 | Reisman | H04H 60/35 |
| | | | 725/37 |
| 2016/0308982 A1 | 10/2016 | Greene | |
| 2018/0323993 A1 | 11/2018 | Ansari et al. | |
| 2019/0012637 A1* | 1/2019 | Gillen | H04L 9/0872 |
| 2019/0052701 A1 | 2/2019 | Rathod | |
| 2020/0004615 A1* | 1/2020 | Kudinov | G06F 16/213 |
| 2020/0042996 A1* | 2/2020 | Mayblum | G06Q 20/36 |
| 2020/0097961 A1* | 3/2020 | Luo | G06Q 20/123 |
| 2020/0104946 A1* | 4/2020 | Mason | G06Q 30/02 |
| 2020/0159889 A1* | 5/2020 | Chui | G06F 21/105 |
| 2020/0159890 A1* | 5/2020 | Chui | G06F 21/128 |
| 2020/0184491 A1 | 6/2020 | Rodkey | |
| 2020/0351341 A1 | 11/2020 | Illowsky et al. | |
| 2020/0396072 A1* | 12/2020 | Maurer | G06F 16/2379 |
| 2022/0156723 A1* | 5/2022 | Lovato | H04L 9/3236 |
| 2022/0247737 A1* | 8/2022 | Hart | H04L 63/0853 |

\* cited by examiner

SYSTEM AND METHOD FOR TRANSFER OF DIGITAL RESOURCES USING AN INTEGRATED RESOURCE PLATFORM

FIELD OF THE INVENTION

The present disclosure embraces a system and method for transfer of digital resources using an integrated resource platform.

BACKGROUND

There is a need for an efficient and expedient way to execute resource transfers.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for transfer of digital resources using an integrated resource platform. In particular, the system may comprise a networked platform that may be accessible by one or more users to access digital resources (e.g., non-fungible tokens stored on a distributed register). The platform may further display a graphical user interface through which the user may take various actions with respect to such digital resources, including the ability to view metadata associated with the resources or to transfer the resources. In this regard, the platform may integrate multiple different types of distributed registers and/or legacy computing systems such that the user may access the digital resources along with the functions associated therewith.

Accordingly, embodiments of the present disclosure provide a system for transfer of digital resources using an integrated resource platform, the system comprising a memory device with computer-readable program code stored thereon; a communication device; and a processing device operatively coupled to the memory device and the communication device, wherein the processing device is configured to execute the computer-readable program code to receive, from a user computing device associated with a user, a request to access a digital resource platform; present, through a graphical interface on a display of the user computing device, the digital resource platform; receive, from the user, a request to acquire a first digital resource and a second digital resource, wherein the first digital resource is stored on a first distributed register and the second digital resource is stored on a second distributed register; convert resources within a user portfolio associated with the user into a first cryptographic resource associated with the first distributed register and a second cryptographic resource associated with the second distributed register; and exchange the first cryptographic resource for the first digital resource and the second cryptographic resource for the second digital resource.

In some embodiments, the computer-readable program code further causes the processing device to prompt the user computing device to provide authentication data; receive the authentication data from the user computing device; and grant access to the digital resource platform to the user computing device.

In some embodiments, the digital resource platform is configured to display a graphical indicator of a value of the first digital resource and a value of the second digital resource.

In some embodiments, the value of the first digital resource and the value of the second digital resource are each displayed in relation to a value of the user portfolio.

In some embodiments, both of the first digital resource and the second digital resource are non-fungible tokens.

In some embodiments, converting the resources within the user portfolio comprises accessing the user portfolio on a legacy server associated with the user.

In some embodiments, the digital resource platform is further configured to present an AI-powered digital resource advisor on the graphical interface.

Embodiments of the present disclosure also provide a computer program product for transfer of digital resources using an integrated resource platform, the computer program product comprising at least one non-transitory computer readable medium having computer-readable program code portions embodied therein, the computer-readable program code portions comprising executable portions for receiving, from a user computing device associated with a user, a request to access a digital resource platform; presenting, through a graphical interface on a display of the user computing device, the digital resource platform; receiving, from the user, a request to acquire a first digital resource and a second digital resource, wherein the first digital resource is stored on a first distributed register and the second digital resource is stored on a second distributed register; converting resources within a user portfolio associated with the user into a first cryptographic resource associated with the first distributed register and a second cryptographic resource associated with the second distributed register; and exchanging the first cryptographic resource for the first digital resource and the second cryptographic resource for the second digital resource.

In some embodiments, the computer-readable program code portions further comprise executable portions for prompting the user computing device to provide authentication data; receiving the authentication data from the user computing device; and granting access to the digital resource platform to the user computing device.

In some embodiments, the digital resource platform is configured to display a graphical indicator of a value of the first digital resource and a value of the second digital resource.

In some embodiments, the value of the first digital resource and the value of the second digital resource are each displayed in relation to a value of the user portfolio.

In some embodiments, both of the first digital resource and the second digital resource are non-fungible tokens.

In some embodiments, converting the resources within the user portfolio comprises accessing the user portfolio on a legacy server associated with the user.

Embodiments of the present disclosure also provide a computer-implemented method for transfer of digital resources using an integrated resource platform, the computer-implemented method comprising receiving, from a user computing device associated with a user, a request to access a digital resource platform; presenting, through a graphical interface on a display of the user computing device, the digital resource platform; receiving, from the user, a request to acquire a first digital resource and a second digital resource, wherein the first digital resource is stored on a first distributed register and the second digital resource is stored on a second distributed register; converting resources within a user portfolio associated with the user into a first cryptographic resource associated with the first distributed register and a second cryptographic resource associated with the second distributed register; and exchanging the first cryptographic resource for the first digital resource and the second cryptographic resource for the second digital resource.

In some embodiments, the computer-implemented method further comprises prompting the user computing device to provide authentication data; receiving the authentication data from the user computing device; and granting access to the digital resource platform to the user computing device.

In some embodiments, the digital resource platform is configured to display a graphical indicator of a value of the first digital resource and a value of the second digital resource.

In some embodiments, the value of the first digital resource and the value of the second digital resource are each displayed in relation to a value of the user portfolio.

In some embodiments, both of the first digital resource and the second digital resource are non-fungible tokens.

In some embodiments, converting the resources within the user portfolio comprises accessing the user portfolio on a legacy server associated with the user.

In some embodiments, the digital resource platform is further configured to present an AI-powered digital resource advisor on the graphical interface.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed register" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed register" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

"Resource" as used herein may refer to tangible or intangible objects which may be held, owned, or used by a user and/or the entity. In this regard, examples of such resources may include electronic data files, documents, computing devices and/or other types of electronic hardware, funds, financial instruments, computing resources, or the like. In some embodiments, a resource may be associated with one or more accounts (e.g., a user account). Accordingly, "resource transfer" or "resource transfer process" as used herein may refer to a transfer of resources from a resource origin to a resource destination, such as a data transfer, provisioning of hardware, transaction (e.g., funds transfer), or the like.

"Non-fungible token" or "NFT" as used herein may refer to data stored in a distributed register that may comprise a signature (e.g., a hash value or address) associated with a digital resource, where the signature certifies that the digital resource is unique (i.e., not interchangeable with other resources). The signature may further identify the owner of the digital resource (e.g., a user, entity, or the like). In this regard, the ownership of the digital resource may be governed by a smart contract stored within the distributed register and associated with the digital resource and/or the NFT. Examples of such digital resources may include image files, audio files, video files, documents, web pages, and the like. In some embodiments, the digital resource may be stored separately from the distributed register (e.g., off-chain on a database server). In other embodiments, the digital resource may be stored within the distributed register (e.g., on-chain within block data).

As use of distributed register technology becomes increasingly common, there is a commensurate increase in the creation, ownership, and transfer of digital resources (e.g., NFT's). That said, NFT's may be created and stored on various different types of distributed registers and have different values, which may pose challenges to the user in managing their digital resources as well as accurately assessing the value of such digital resources. Accordingly, the system as described herein provides a user with a centralized location through which the user may view and/or manage NFT's and/or metadata associated with such NFT's. In particular, the platform may aggregate information about NFT's that are stored on different distributed register technologies and present the information to the user via a graphical interface which may be accessible through a user device associated with the user (e.g., a personal computing device, smartphone, or the like).

The platform may connect to various types of distributed registers, legacy systems, exchanges, and the like (e.g., via an API-based connection). In this way, the platform may pull information related to digital resources from the various distributed registers and/or exchanges and integrate such information with information regarding the user's portfolios. For instance, the graphical interface of the platform may display the market value of the digital resources (e.g., NFT's) which may be owned by the user, where the market value is displayed in one or more currencies (e.g., USD). The system may further display a visualization (e.g., graph, chart, table, or the like) of how the digital resources fit into the user's overall portfolio of resources (e.g., the visualization may show that NFT's make up 5% of the user's resource portfolio).

In addition to displaying information related to the digital resources, the platform may further provide the functionality for the user to manage, acquire, and/or transfer the digital resources. To this end, the platform may dynamically and automatically resolve the chain of actions needed for a particular user to take a certain action with respect to a digital resource, thereby providing a layer of abstraction to the user. For instance, the user may wish to purchase an NFT that is stored on a particular distributed register, but the user may not have the requisite familiarity with the distributed register product (e.g., which currency the distributed register uses, how to transfer such currency to a secure party in exchange for the NFT, or the like). In such an embodiment, the user may select the NFT of choice through the graphical interface. The platform may then, via the API-based connection to the legacy financial systems associated with the user's portfolio, automatically convert resources owned by the user (e.g., a fiat currency belonging by the user) to the type of resource necessary to acquire the NFT (e.g., the cryptocurrency associated with the distributed register on which the selected NFT is stored). Once the resource conversion has taken place, the system may automatically use the converted resources to procure ownership of the NFT for the user (e.g., by executing the smart contract logic on behalf of the user). In this way, the system may allow the user to seamlessly acquire an NFT using a native resource (e.g., currency) owned by the user. Similarly, the platform may further allow the user to trade or sell the NFT to other users, whereby the platform handles the resource conversions and other steps necessary to transfer ownership of the NFT from the user to another entity.

Subsequent to the acquisition of the NFT, the user may use the platform to view the current market value of each acquired NFT, which may be displayed in one or a number of different currencies, depending on the user's settings or preferences. The platform may further display (e.g., using a pie chart) the proportion of equity that the NFT may represent with respect to the user's overall portfolio. In this way, the platform provides a way to not only quickly and effectively manage digital resources, but also to assess the value of such digital resources.

An exemplary use case is provided as follows for illustrative purposes only and is not intended to reduce or limit the scope of the disclosure. In one embodiment, a user may be a customer of a financial institution which owns and/or operates the platform. The user may have a portfolio with the financial institution, where the portfolio contains one or more resources (e.g., a fiat currency). The user may log onto the integrated platform through a user computing device (e.g., a smartphone). In some embodiments, the integrated platform may be accessible through a web application. In other embodiments, the functions of the platform may be accessible through an application installed on the user computing device.

The platform may require the user to provide authentication credentials (e.g., a username and password, secure token, biometric data, or the like) to access the platform. Once the user has logged on, the user may be presented with a graphical interface containing various interface elements for receiving input from the user (e.g., interactive buttons, links, text entry fields, and the like) as well as providing output to the user (e.g., display windows or areas, text boxes, or the like). Through the platform, the user may wish to acquire a first digital resource (e.g., an NFT associated with an image file) stored on a first distributed register, and a second digital resource (e.g., an NFT associated with a document) stored on a second distributed register. To initiate the process, the user may select the first digital resource and the second digital resource through the graphical interface.

Upon detecting that the user has selected the two digital resources, the platform may display the total amount of resources needed to acquire the two digital resources, along with individual and/or total values of the selected digital resources and any other amount of resources needed to cover the transfer of ownership of the two digital resources. In this regard, the values and/or resource amounts may be displayed to the user in a format according to the user's preferences (e.g., USD).

In calculating the values, the platform may determine the various resource conversions needed to acquire the NFT's. For instance, the first digital resource may require a transaction using a first resource type associated with the first distributed register (e.g., a first cryptocurrency), while the second digital resource may require a transaction using a second resource type associated with the second distributed register (e.g., a second cryptocurrency). Furthermore, there may be additional costs in acquiring the digital resources (e.g., cryptocurrency gas). Accordingly, the system may compute and provide the total amount of resources (in the currency preferred by the user) to be taken from the user's portfolio to execute the transfer of ownership of the two digital resources. Once the user has approved the transaction of the two digital resources, the system may automatically perform all conversions and execute all steps necessary to acquire the two digital resources on behalf of the user. In this way, the system removes the need for the user to be aware of the individual steps necessary to acquire NFT's, even if the NFT's are hosted on disparate distributed register technologies.

Once the digital resources are acquired, the platform may display the current value of the digital resources in one or more of various formats (e.g., plaintext, table, bar graph, pie chart, line graph, or the like). The platform may further provide a function for selling and/or trading the acquired digital resources for resources in the user's preferred format. In this way, the system further allows the user to convert the digital resources into liquid capital.

In some embodiments, the platform may further comprise a digital resource advisor function. The digital resource advisor may be an agent of the entity or an AI-powered bot that may provide assistance in the management and/or valuation of the digital resources. In this regard, the digital resource advisor may provide information to the user regarding the best way to manage the digital resource (e.g., royalty arrangements, sale or transfer, or the like).

The system as described herein confers a number of technological advantages over conventional resource transfer systems, particularly with respect to transfers related to digital resources. For instance, by providing a platform that integrates various disparate distributed register technologies along with legacy computing systems, the platform provides a seamless way for the user to acquire, manage, and inspect digital resources in a centralized manner.

Figure 1:
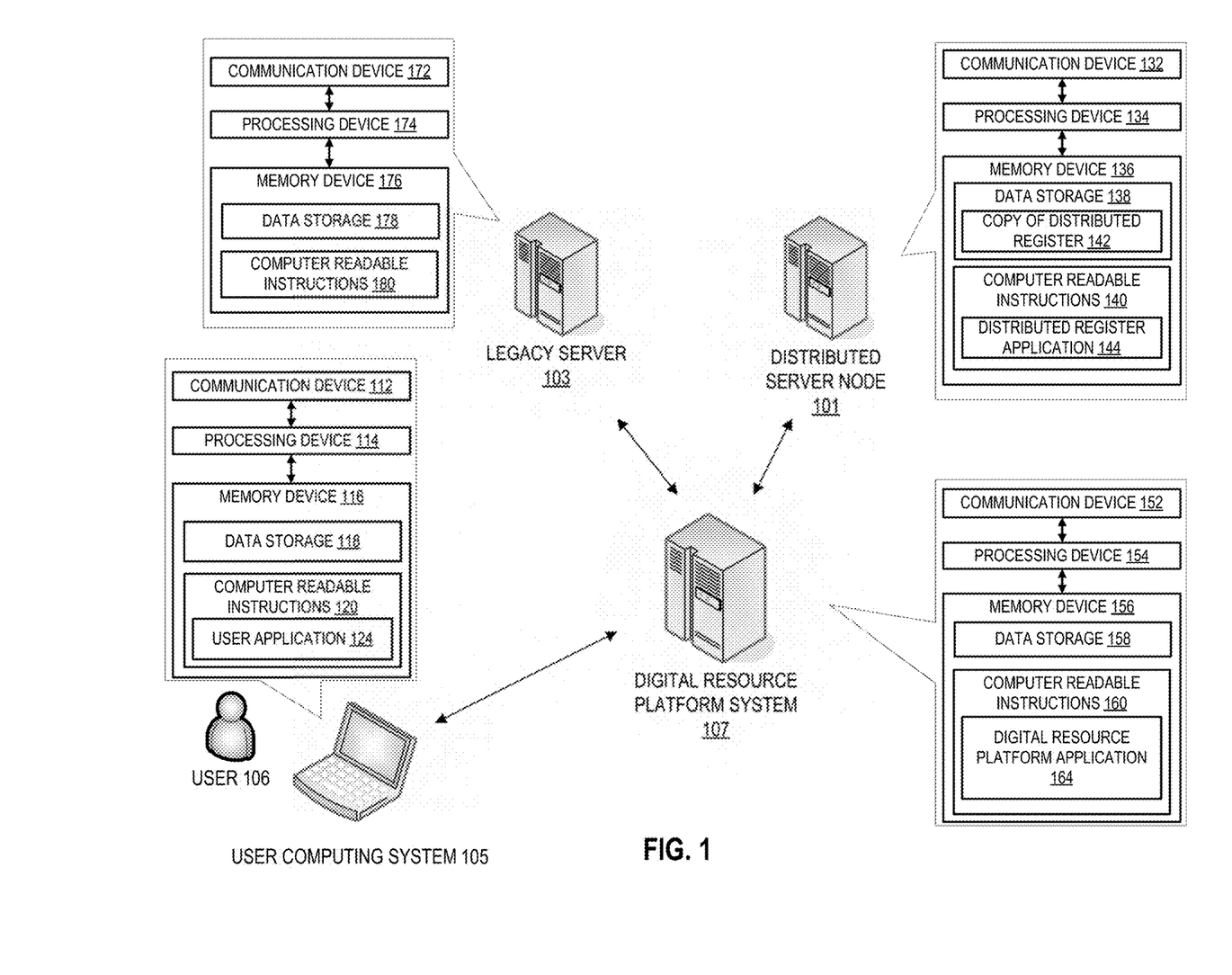
FIG. 1 illustrates an operating environment for the digital resource management system, in accordance with one embodiment of the present disclosure.

Turning now to the figures, FIG. 1 illustrates an operating environment 100 for the digital resource management system, in accordance with one embodiment of the present disclosure. In particular, FIG. 1 illustrates a digital resource platform system 107 in operative communication with a user computing system 105, distributed server node 101, and legacy server 103 over a network. In such a configuration, the digital resource platform system 107 may transmit data to and receive data from computing systems over the network, including the user computing system 105, distributed server node 101, and legacy server 103.

It should be understood that FIG. 1 illustrates only an exemplary embodiment of the operating environment 100, and it will be appreciated that the operating environment 100 may comprise fewer or greater numbers of computing systems than what is depicted in FIG. 1. For example, though FIG. 1 depicts a single distributed server node 101, the operating environment may comprise multiple distributed server nodes which may host one or more disparate types of distributed registers. It should also be appreciated that one or more functions of the systems, devices, or servers as depicted in FIG. 1 may be combined into a single system, device, or server and/or performed by other computing systems. For instance, though the digital resource platform system 107 and legacy server 103 are depicted as separate computing systems, it is within the scope of the disclosure for the functions of both computing systems to be executed on a single computing system. Furthermore, the functions of a single system, device, or server as depicted in FIG. 1 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the digital resource platform system 107 may be a computing system that performs the digital resource management functions as described herein. Accordingly, the digital resource platform system 107 may comprise a processing device 154 operatively coupled to a communication device 152 and a memory device 156. The memory device 156 may comprise data storage 158 and computer readable instructions 160 stored thereon, where the computer readable instructions 160 may comprise a digital resource platform application 164. The digital resource platform application 164 may, when executed by the processor 154 of the digital resource platform system 107, cause the processor 154 to perform the digital resource management functions of the digital resource platform system, which may include authenticating the user, operating the digital resource platform, aggregating data and/or interacting with distributed register systems and/or legacy systems, providing digital resource advisor functions, and the like.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

As illustrated in FIG. 1, the distributed server node 101 may, in combination with other distributed server nodes, form a cluster of nodes that host a distributed register on which digital resources may be stored. Accordingly, the distributed server node 101 may comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, WiFi or Ethernet adapter, radio transceiver, or other device for communicating with other devices on the network.

The memory device 136 comprises computer-readable instructions 140 and data storage 138, where the data storage 138 may comprise a copy of a distributed register 142. The distributed register (and the copy of the distributed register 142) may comprise a series of data records relevant to the objectives of an entity associated with the distributed server network 109. For instance, the distributed register may comprise one or more digital resources (e.g., NFT's) to be managed by the digital resource platform system 107. In this regard, the computer-readable instructions 140 may have a distributed register application 144 stored thereon, where the distributed register application 144 may allow the distributed server node 101 to read data from the distributed register, submit data records to the distributed register, participate in consensus mechanisms, or the like.

As further illustrated in FIG. 1, the user computing system 105 may be in operative communication with the distributed server node 101, the digital resource platform system 107, and/or the legacy server 103. The user computing system 105 may be a computing system owned and/or operated by a user 106, where the user may be a customer of the entity. In particular, the user 106 may use the user computing system 105 to access the platform hosted by the digital resource platform system 107. Accordingly, the user computing system 105 may comprise a communication device 112, a processing device 114, and a memory device 116. In some embodiments, the user computing system 105 may comprise hardware and/or software components that allow the user computing system 105 to interface with the user 106. In such embodiments, the user computing system 105 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The memory device 116 of the user computing system 105 may further comprise data storage 118 and computer-readable instructions 120 stored thereon, where the computer-readable instructions 120 may comprise a user application 124. The user application 124 may be a software application that the user 106 may use to access the digital resource platform and the functions provided therein.

As shown in FIG. 1, the operating environment may further comprise a legacy server 103. The legacy server 103 may be a computing system that may store information associated with the user 106. For instance, the legacy server 103 may be a financial server that may store information relating to the user's portfolio held with a financial institution. In such an embodiment, the legacy server 103 may be connected to the digital resource platform system 107 to provide the information associated with the user to the digital resource platform system 107. Accordingly, the legacy server 103 may comprise a processing device 174 operatively coupled to a communication device 172 and a memory device 176, where the memory device 176 may comprise data storage 178 and computer readable instructions 180.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

Figure 2:
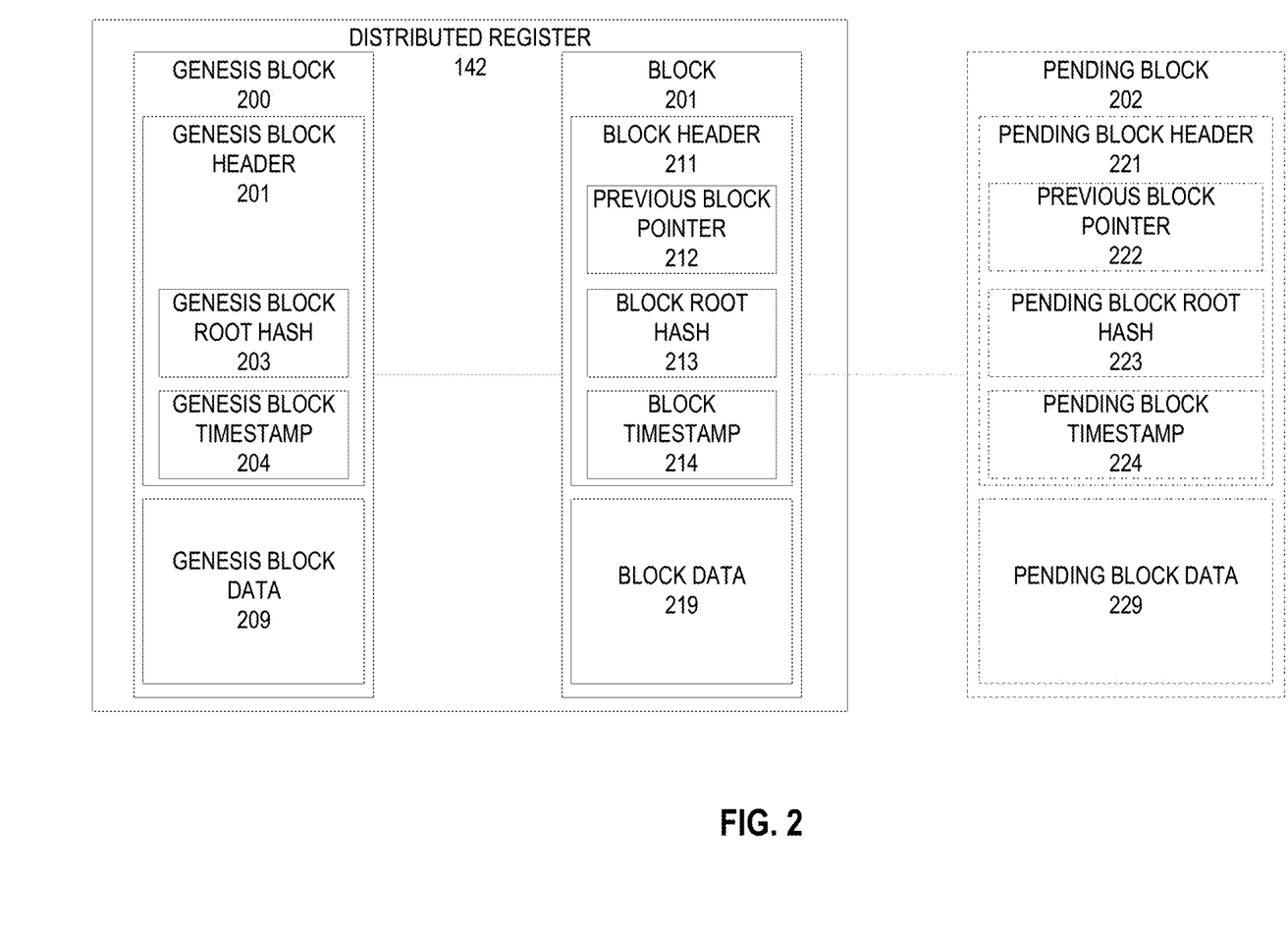
FIG. 2 is a block diagram illustrating the data structures within an exemplary distributed register, in accordance with one embodiment of the present disclosure.

FIG. 2 is a block diagram illustrating the data structures within an exemplary distributed register, in accordance with some embodiments. In particular, FIG. 2 depicts a plurality of blocks 200, 201 within the distributed register 142, in addition to a pending block 202 that has been submitted to be appended to the distributed register 142. The distributed register 142 may comprise a genesis block 200 that serves as the first block and origin for subsequent blocks in the distributed register 142. The genesis block 200, like all other blocks within the distributed register 142, comprise a block header 201 and block data 209. The genesis block data 209, or any other instances of block data within the distributed register 142 (or any other distributed register) may contain one or more data records. For instance, block data may comprise software source code, authentication data, transaction data, documents or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the distributed register 142. In some embodiments, the timestamp may be a Unix timestamp. In some embodiments, particularly in ledgers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block structure. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (e.g., the genesis block 200) in the distributed register 142, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the ledger to pass the validation checks imposed by the consensus algorithm. Thus, the computational impracticability of altering data records in a ledger in turn greatly reduces the probability of improper alteration of data records.

A pending block 202 or "proposed block" may be submitted for addition to the distributed register 142. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the distributed register 142. A pending block timestamp 224 may also be added to signify the time at which the pending block 202 is added to the distributed register 142.

In other embodiments, the consensus mechanism may be based on a total number of consensus inputs submitted by the nodes of the distributed register 142, e.g., a PBFT consensus mechanism. Once a threshold number of consensus inputs to validate the pending block 202 has been reached, the pending block 202 may be appended to the distributed register 142. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

Figure 3:
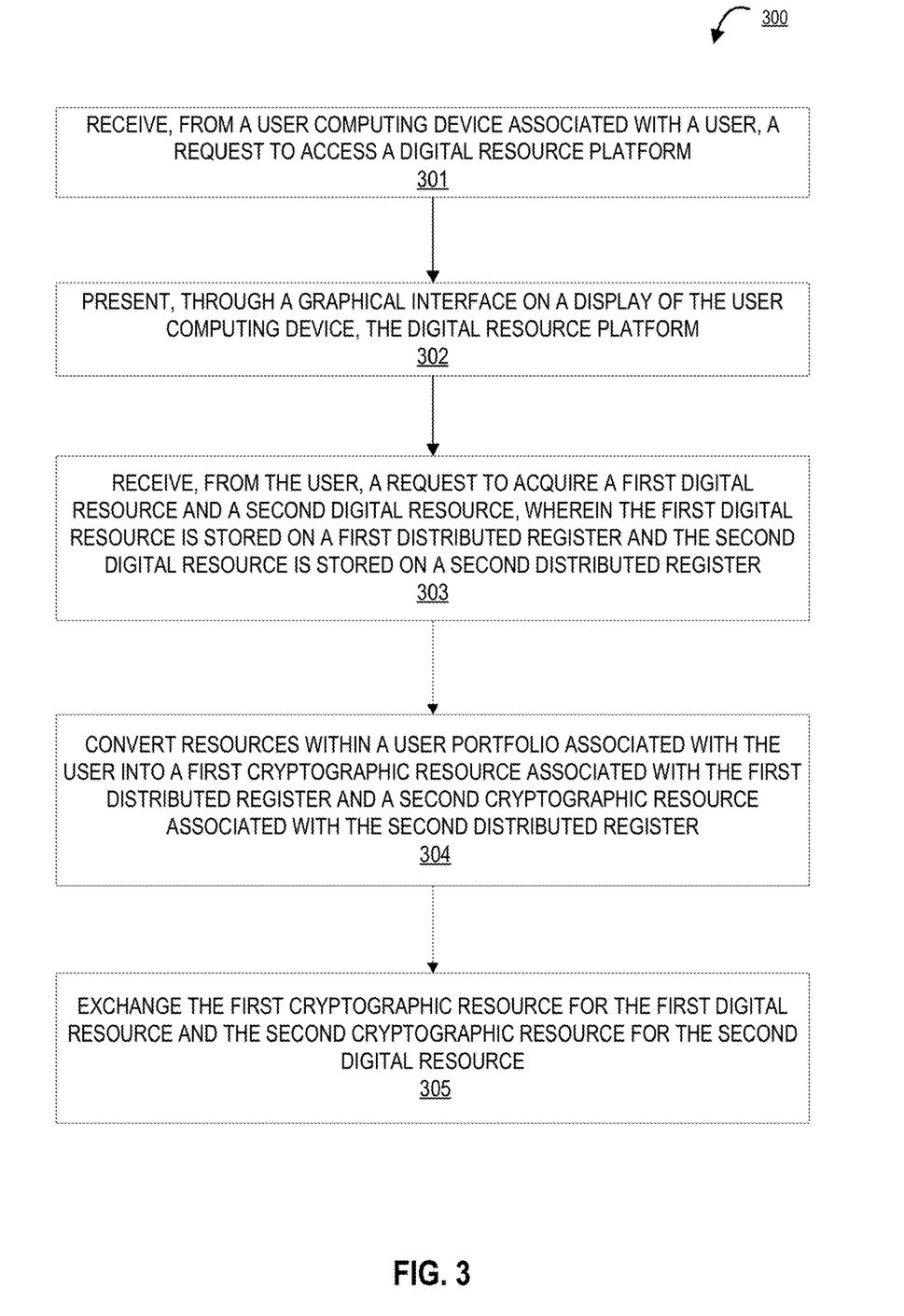
FIG. 3 is a flow diagram illustrating a process for transferring a digital resource using an integrated platform, in accordance with one embodiment of the present disclosure.

FIG. 3 is a flow diagram illustrating a process flow 300 for transferring a digital resource using an integrated platform, in accordance with one embodiment of the present disclosure. The process begins at block 301, where the system receives, from a user computing device associated with a user, a request to access a digital resource platform. The user may wish access the platform in order to view and/or manage digital resources (e.g., NFT's). To this end, the user may log onto the digital resource platform, for instance, through a web browser application or a platform-specific application installed on the user computing device. In some embodiments, the system may require that the user provide authentication data to access the platform. In such embodiments, the system may receive authentication data (e.g., username and password, biometric data, or the like) from the user computing device, authenticate the user based on the authentication data, and grant access to the digital resource platform to the user computing device.

The process continues to block 302, where the system presents, through a graphical interface on a display of the user computing device, the digital resource platform. Once the user has been authenticated, the functions of the digital resource platform may be accessible to the user. The digital resource platform may provide a listing of digital resources (e.g., NFT's) that may be available for acquisition through the digital resource platform. In such embodiments, the digital resource platform may display a graphical indicator of the amount of resources necessary to acquire a particular digital resource. For instance, the user may have a user portfolio containing an amount of a fiat currency and wish to acquire an NFT. In such an embodiment, the platform may display (e.g., in plaintext) the amount of such currency that would be needed to acquire the NFT.

In some embodiments, the platform may further display a value of the user portfolio along with a value of any digital resources belonging to the user. For instance, if the user has ownership of one or more NFT's, the platform may display (e.g., in the user's preferred currency) the value of each of the one or more NFT's. The platform may further display the proportion of value represented by the NFT's in relation to the user portfolio as a whole. In this way, the user is able to gain a visual insight into the representation of digital resources within the user's portfolio.

The process continues to block 303, where the system receives, from the user, a request to acquire a first digital resource and a second digital resource, wherein the first digital resource is stored on a first distributed register and the second digital resource is stored on a second distributed register. In an exemplary embodiment, the user may wish to acquire two NFT's that are stored on disparate distributed register technologies. In this regard, the platform may be communicatively coupled with the two distributed registers on which the NFT's are stored such that the platform may view the data records on the distributed registers and submit proposed data records.

The process continues to block 304, where the system converts resources within a user portfolio associated with the user into a first cryptographic resource associated with the first distributed register and a second cryptographic resource associated with the second distributed register. Continuing the example, the system may detect that the first digital resource (e.g., rights to an NFT) is stored on the first distributed register such that acquisition of the first digital resource requires a transfer of the first cryptographic resource (e.g., a first cryptocurrency required by the first distributed register). Similarly, the second digital resource may be stored on a second distributed register such that acquisition of the second digital resource requires a transfer of a second cryptocurrency. The system may automatically convert the resources within the user portfolio (e.g., fiat currency) into the appropriate amounts of the first cryptographic resource and the second cryptographic resource in order to acquire the first digital resource and the second digital resource.

The process concludes at block 305, where the system exchanges the first cryptographic resource for the first digital resource and the second cryptographic resource for the second digital resource. The system may use the first cryptocurrency to acquire the first digital resource within the first distributed register and use the second cryptocurrency to acquire the second digital resource within the second distributed register. By creating a layer of abstraction for the user, the platform allows the user to acquire digital resources without the need to understand the mechanisms behind the various distributed register technologies on which the digital resources may be hosted.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for transfer of digital resources using an integrated resource platform, the system comprising:
    a memory device with computer-readable program code stored thereon;
    a communication device; and
    a processing device operatively coupled to the memory device and the communication device, wherein the processing device is configured to execute the computer-readable program code to:
    receive, from a user computing device associated with a user, a request to access a digital resource platform;
    present, through a graphical interface on a display of the user computing device, the digital resource platform;
    receive, from the user, a request to acquire a first digital resource and a second digital resource, wherein the first digital resource is stored on a first distributed register and the second digital resource is stored on a second distributed register;
    compute a total amount of resources needed to acquire the first digital resource and the second digital resource;
    present, through the graphical interface, the total amount of resources needed to acquire the first digital resource and the second digital resource, and
    receive, from the user, an approval to execute a resource conversion process;
    execute the resource conversion process, wherein the process comprises:
        converting resources within a user portfolio associated with the user into a first cryptographic resource associated with the first distributed register and a second cryptographic resource associated with the second distributed register;

exchanging the first cryptographic resource for the first digital resource and the second cryptographic resource for the second digital resource; and transferring ownership of the first digital resource and the second digital resource to the user portfolio.

2. The system according to claim 1, wherein the computer-readable program code further causes the processing device to:

prompt the user computing device to provide authentication data;

receive the authentication data from the user computing device; and grant access to the digital resource platform to the user computing device.

3. The system according to claim 1, wherein the digital resource platform is configured to display a graphical indicator of a value of the first digital resource and a value of the second digital resource.

4. The system according to claim 3, wherein the value of the first digital resource and the value of the second digital resource are each displayed in relation to a value of the user portfolio.

5. The system according to claim 1, wherein both of the first digital resource and the second digital resource are non-fungible tokens.

6. The system according to claim 1, wherein converting the resources within the user portfolio comprises accessing the user portfolio on a legacy server associated with the user.

7. The system according to claim 1, wherein the digital resource platform is further configured to present an AI-powered digital resource advisor on the graphical interface.

8. A computer program product for transfer of digital resources using an integrated resource platform, the computer program product comprising at least one non-transitory computer readable medium having computer-readable program code portions embodied therein, the computer-readable program code portions comprising executable portions for:

receiving, from a user computing device associated with a user, a request to access a digital resource platform;

presenting, through a graphical interface on a display of the user computing device, the digital resource platform;

receiving, from the user, a request to acquire a first digital resource and a second digital resource, wherein the first digital resource is stored on a first distributed register and the second digital resource is stored on a second distributed register;

computing a total amount of resources needed to acquire the first digital resource and the second digital resource;

presenting, through the graphical interface, the total amount of resources needed to acquire the first digital resource and the second digital resource, and receiving, from the user, an approval to execute a resource conversion process;

executing the resource conversion process, wherein the process comprises:

converting resources within a user portfolio associated with the user into a first cryptographic resource associated with the first distributed register and a second cryptographic resource associated with the second distributed register;

exchanging the first cryptographic resource for the first digital resource and the second cryptographic resource for the second digital resource; and transferring ownership of the first digital resource and the second digital resource to the user portfolio.

9. The computer program product of claim 8, wherein the computer-readable program code portions further comprise executable portions for:

prompting the user computing device to provide authentication data;

receiving the authentication data from the user computing device; and granting access to the digital resource platform to the user computing device.

10. The computer program product of claim 8, wherein the digital resource platform is configured to display a graphical indicator of a value of the first digital resource and a value of the second digital resource.

11. The computer program product of claim 10, wherein the value of the first digital resource and the value of the second digital resource are each displayed in relation to a value of the user portfolio.

12. The computer program product of claim 8, wherein both of the first digital resource and the second digital resource are non-fungible tokens.

13. The computer program product of claim 8, wherein converting the resources within the user portfolio comprises accessing the user portfolio on a legacy server associated with the user.

14. A computer-implemented method for transfer of digital resources using an integrated resource platform, the computer-implemented method comprising:

receiving, from a user computing device associated with a user, a request to access a digital resource platform;

presenting, through a graphical interface on a display of the user computing device, the digital resource platform;

receiving, from the user, a request to acquire a first digital resource and a second digital resource, wherein the first digital resource is stored on a first distributed register and the second digital resource is stored on a second distributed register;

computing a total amount of resources needed to acquire the first digital resource and the second digital resource;

presenting, through the graphical interface, the total amount of resources needed to acquire the first digital resource and the second digital resource, and receiving, from the user, an approval to execute a resource conversion process;

executing the resource conversion process, wherein the process comprises:

converting resources within a user portfolio associated with the user into a first cryptographic resource associated with the first distributed register and a second cryptographic resource associated with the second distributed register;

exchanging the first cryptographic resource for the first digital resource and the second cryptographic resource for the second digital resource; and transferring ownership of the first digital resource and the second digital resource to the user portfolio.

15. The computer-implemented method of claim 14, wherein the computer-implemented method further comprises:

prompting the user computing device to provide authentication data;

receiving the authentication data from the user computing device; and granting access to the digital resource platform to the user computing device.

16. The computer-implemented method of claim 14, wherein the digital resource platform is configured to display a graphical indicator of a value of the first digital resource and a value of the second digital resource.

17. The computer-implemented method of claim 16, wherein the value of the first digital resource and the value of the second digital resource are each displayed in relation to a value of the user portfolio.

18. The computer-implemented method of claim 14, wherein both of the first digital resource and the second digital resource are non-fungible tokens.

19. The computer-implemented method of claim 14, wherein converting the resources within the user portfolio comprises accessing the user portfolio on a legacy server associated with the user.

20. The computer-implemented method of claim 14, wherein the digital resource platform is further configured to present an AI-powered digital resource advisor on the graphical interface.

* * * * *